United States Patent
Dell'Eva et al.

(10) Patent No.: US 7,614,307 B2
(45) Date of Patent: Nov. 10, 2009

(54) MANIFOLD ASSEMBLY HAVING A CENTRALIZED PRESSURE SENSING PACKAGE

(75) Inventors: Mark Louis Dell'Eva, Grand Blanc, MI (US); Timothy John Green, Holly, MI (US); David Edward Herbert, Rochester Hills, MI (US)

(73) Assignee: Eaton Corporation, Cleveland, OH (US)

( * ) Notice: Subject to any disclaimer, the term of this patent is extended or adjusted under 35 U.S.C. 154(b) by 314 days.

(21) Appl. No.: 11/447,323

(22) Filed: Jun. 6, 2006

(65) Prior Publication Data

US 2007/0277754 A1 Dec. 6, 2007

(51) Int. Cl.
*G01L 7/00* (2006.01)
(52) U.S. Cl. ........................................................ 73/714
(58) Field of Classification Search ................ 73/756, 73/714; 137/15.09, 360
See application file for complete search history.

(56) References Cited

U.S. PATENT DOCUMENTS

| 6,116,281 | A | * | 9/2000 | Mastromatteo | 137/863 |
|---|---|---|---|---|---|
| 6,619,142 | B1 | * | 9/2003 | Forster et al. | 73/861.74 |
| 6,662,664 | B2 | * | 12/2003 | Ferris | 73/756 |
| 6,807,472 | B2 | | 10/2004 | Ford | |
| 7,231,831 | B1 | * | 6/2007 | Lancaster | 73/756 |
| 2002/0088304 | A1 | | 7/2002 | Thorum et al. | |

FOREIGN PATENT DOCUMENTS

| EP | 1 767 822 A | 3/2007 |
|---|---|---|
| WO | WO 0030909 A | 6/2000 |

OTHER PUBLICATIONS

PCT Search Report, PCT IB/2007/001520 search completed Oct. 15, 2007.

* cited by examiner

*Primary Examiner*—Jewel Thompson
(74) *Attorney, Agent, or Firm*—Anna M. Shih

(57) ABSTRACT

A hydraulic manifold assembly includes a manifold containing a plurality of hydraulic channels that direct fluid to a centralized location and a package disposed at the centralized location to measure fluid pressure at pressure ports corresponding to the hydraulic channels. The manifold assembly directs fluid to the single package rather than scattering fluid outputs to multiple sensor locations, simplifying the overall assembly configuration.

5 Claims, 5 Drawing Sheets

MANIFOLD ASSEMBLY HAVING A CENTRALIZED PRESSURE SENSING PACKAGE

TECHNICAL FIELD

The present invention relates to manifolds for routing fluid, and more particularly to a manifold assembly having sensors for measuring fluid pressure in the manifold.

BACKGROUND OF THE INVENTION

Electronically controlled solenoid operated valves provide improved shifting capabilities for the transmission compared to hydro-mechanical shift control and, in particular, permits staged or progressive release and application of clutches, such as band clutches and/or plate clutches, for effecting smoother speed changes in the transmission. In currently-known production transmissions, these valve assemblies are mounted internally on the transmission valve body and supplied with pressurized fluid from a pump disposed in the transmission. Shifting is performed using open loop control of the valves, which requires time-consuming and costly calibration of each valve in the transmission system. However, as the valves wear over time and as the viscosity of the transmission fluid changes due to age and contamination, the transmission system moves away from its initial calibration conditions, reducing the shifting performance of the transmission.

Closed loop control of solenoid operated valves has been proposed as a way to obviate the need for precise calibration of the solenoid pilot and regulating valves used for clutch engagement and line pressure regulation in an automatic speed change transmission. Preferably, closed loop control includes providing a feedback signal that indicates the torque transmitted by a particular shifting clutch band or plate to the solenoid valve. U.S. Pat. No. 6,807,472 describes a system that allows closed loop control of a transmission system by using pressure sensors to sense the hydraulic pressure to each clutch actuator and provide an electrical signal to a transmission control unit (TCU) corresponding to the sensed pressure. The TCU then determines the difference between the actual sensed pressure and a target pressure corresponding to the desired output pressure to the actuators. The TCU controls the current level or the duty-cycle sent to either a linear or pulse-width-modulated (PWM) solenoid-operated valve to control the clutch regulator valve or the clutch actuator directly until the actual pressure reaches the target pressure. This closed loop feedback ensures that the shift actuators provide smooth transmission shifting operation, even with temperature changes, valve wear, and transmission fluid contamination.

Piezoelectric pressure transducers are often a preferred choice in many sensing applications because of their low cost, but they pose numerous design challenges due to their non-linear response, low output signal strength, and temperature sensitivity. Thus, using piezoelectric pressure transducers requires signal amplification and correction for non-linearities. Corrections may be carried out by, for example, mixed-signal ASICs. Further, the pressure transducers must be positioned so that current can be carried from the TCU to the solenoid valves and that signals can be carried from the pressure transducers back to the TCU to effect control of valves based on the pressure transducer signals.

Placing discrete, isolated, single transducers in a transmission system having a signal communication interface, such as a lead frame, stamped metal traces, flex-circuits, plated circuits, a wire harness, wireless means, etc. to carry current and signals between the TCU, solenoid valves, and transducers increases the overall complexity of the system and also exposes the transducers to current spikes from the solenoids in the valves. Because the transducers output low-level signals, the noise generated by the current spikes will create unacceptable signal errors.

There is a desire for a manifold structure that incorporates low-cost pressure transducers while reducing noise sensitivity and complexity. There is also a desire for a manifold that allows pressure monitoring to be conducted at a centralized location on the manifold.

SUMMARY OF THE INVENTION

The invention is generally directed to a hydraulic manifold assembly containing a plurality of hydraulic channels that direct fluid to a centralized location and a package disposed at the centralized location to measure fluid pressure within the hydraulic channels. In one embodiment, the package includes one or more pressure transducers and a microprocessor, microcontroller, or state-machine incorporated into a single package, making it attachable to the manifold in one step instead of requiring individual linking of each pressure transducer from a remote location to the manifold. The package may be configured to have its own ports that align with pressure ports associated with the hydraulic channels in the manifold to form fluidic paths between the manifold and the transducer.

The manifold itself is designed to direct fluid to the package rather than scatter fluid outputs to multiple locations. In one embodiment, the hydraulic channels are closed by a top plate and a gasket.

DETAILED DESCRIPTION OF THE INVENTION

Figure 1A:
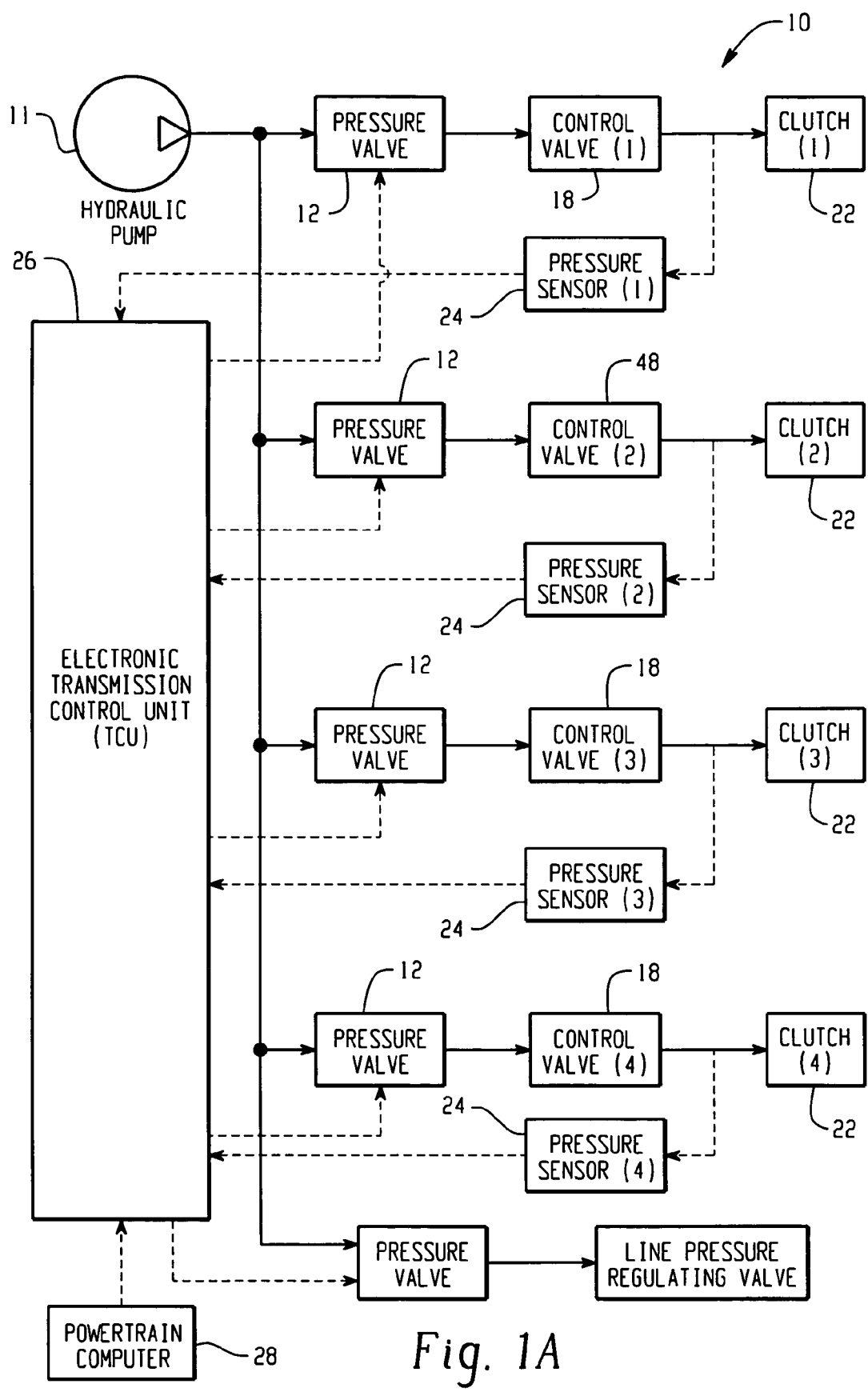
FIGS. 1A and 1B are block diagrams of a closed loop transmission control system in which a package according to one embodiment of the invention can be used.
Figure 1B:
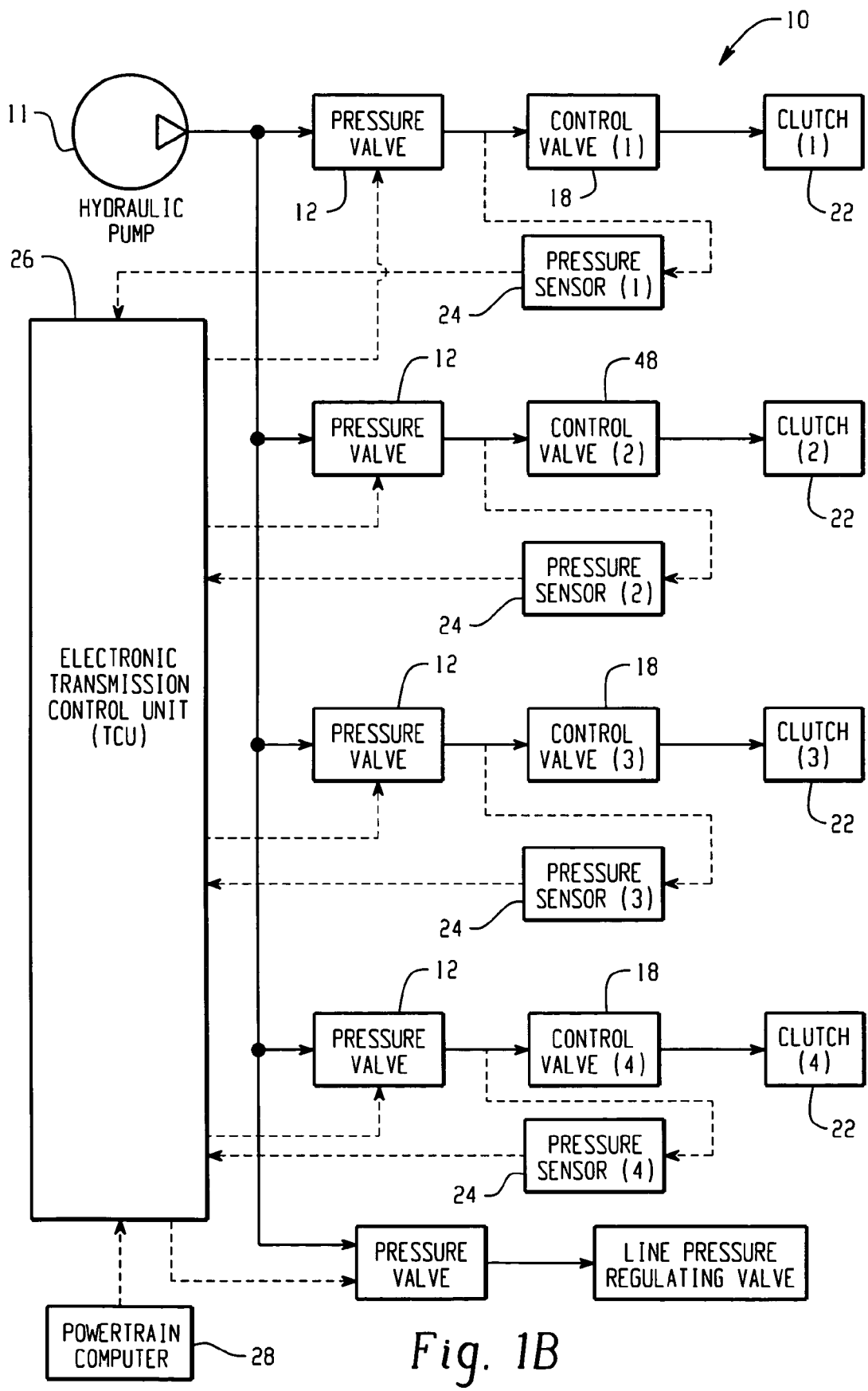

FIGS. 1A and 1B are representative block diagrams illustrating a closed-loop pressure control system 10 for a vehicle transmission in which a manifold assembly according to the invention can be used. Note that these figures are for illustrative purposes only to describe one possible application for the inventive package and are not meant to limit the scope of the invention in any way. Those of ordinary skill in the art will understand that the inventive system may be used in other applications without departing from the scope of the invention.

The system 10 may include a plurality of solenoid operated valves 12 supplied with pressurized hydraulic fluid from a pump 11, which may be driven by a transmission input shaft. Each valve 12 supplies pressurized fluid along a conduit to a hydraulic control valve 18, and the output of each hydraulic control valve 18 is applied through a conduit to a hydraulically actuated clutch 22, as for example, a band clutch or plate clutch, for controlling torque transmission upon a speed (gear) change.

The pressure supplied to each clutch (FIG. 1A) or to each control valve (FIG. 1B) along the clutch's respective conduit 20 is sensed by a pressure transducer 24, which provides an electrical indication of the sensed pressure, as shown by a dashed line in FIGS. 1A and 1B, to an electronic transmission control unit (TCU) 26. The TCU 26 also receives an input in the form of a command pressure signal from a powertrain computer 28 that is programmed to provide the desired shift characteristics for the particular vehicle and engine-transmission combination. The pressure transducers 24 may comprise any appropriate pressure sensor, such as a piezoelectric sensor.

In the inventive structure, one or more pressure transducers 24 are incorporated into a unitary package 30 that can be easily incorporated into the transmission system 10 (e.g., by attachment to the TCU 26 or the manifold). Possible configurations for the package 30 itself are described in commonly assigned, co-pending U.S. patent application Ser. No. 11/235,614 entitled "Pressure Transducer Package for a Manifold," the disclosure of which is incorporated herein by reference in its entirety.

Figure 5:
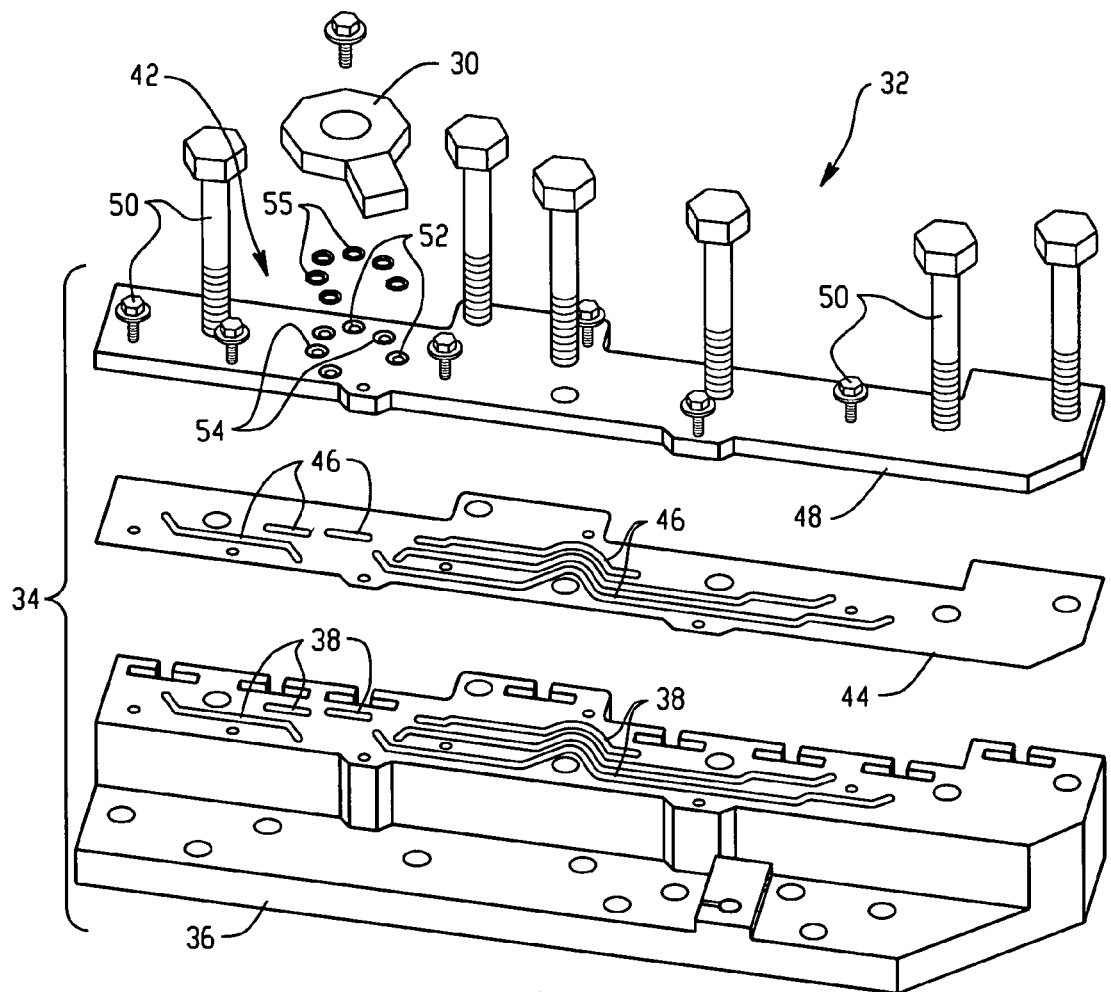
FIG. 5 is an exploded view of the manifold assembly according to one embodiment of the invention.
Figure 6:
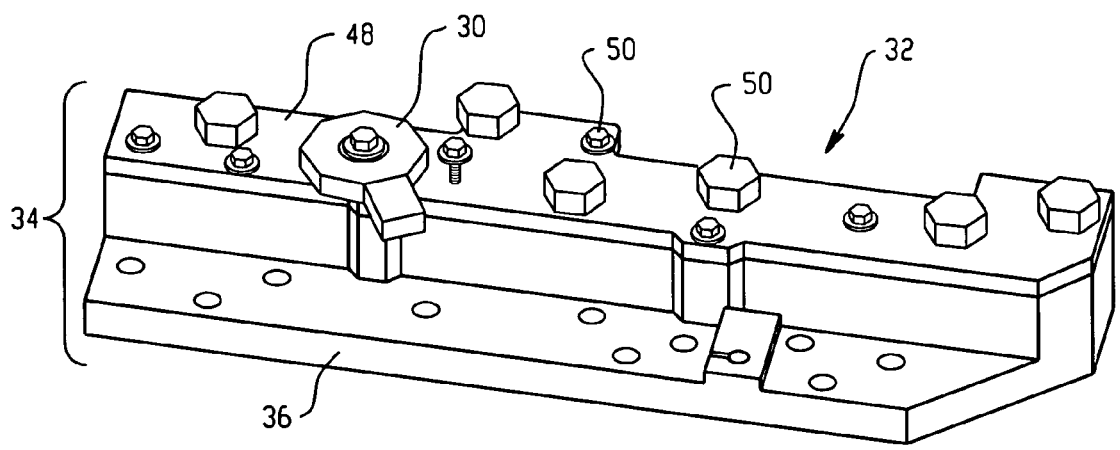
FIG. 6 is an assembled view of the system in FIG. 5.

FIGS. 5 and 6 show a manifold assembly 32 incorporating the package 30 on a manifold 34. In one embodiment, the package 30 may be manufactured separately from the manifold 34 and can be connected to the manifold 34 by a harness, lead frame, flex-circuit, or any other connector. Referring to FIG. 5, the manifold 34 includes a body portion 38 having a plurality of hydraulic channels, 38. The hydraulic channels 38 are configured so that they route fluid to a central location 42 at which the package 30 is to be attached to the manifold 34.

The manifold 34 may also include a gasket 44 disposed on top of the body portion 36 to act as a seal. The gasket 44 includes a plurality of openings 46 that corresponding generally to the hydraulic channels 38 in the body portion 36. A top plate 48 closes off the manifold 34 and is attached to the body portion 36 with a plurality of bolts 50. The top plate 48 also includes a cluster of openings at the central location 42 to form pressure ports 52 corresponding to the hydraulic channels 38. By routing the hydraulic channels 38 and clustering the pressure ports 52 in this manner, sensors in the package 30 can monitor the pressure in multiple channels 38 without requiring the sensors to be disposed in remote locations.

In one embodiment, each pressure port 52 corresponds to one of the hydraulic channels 38. If desired, the top plate 48 may include counterbores 54 that accept O-ring seals 55 for sealing the pressure ports 52 and form fluid-tight paths between the pressure ports 52 in the manifold 34 and corresponding pressure ports 52a (FIG. 2B) in the package 30. Note that the package 30 can be sealed against the top plate 48 using gaskets or any other component as well.

FIGS. 2A through 4 show possible transducer arrangements in the package 30. Note that invention is not limited to these configurations and that other configurations are possible without departing from the scope of the invention.

Figure 2A:
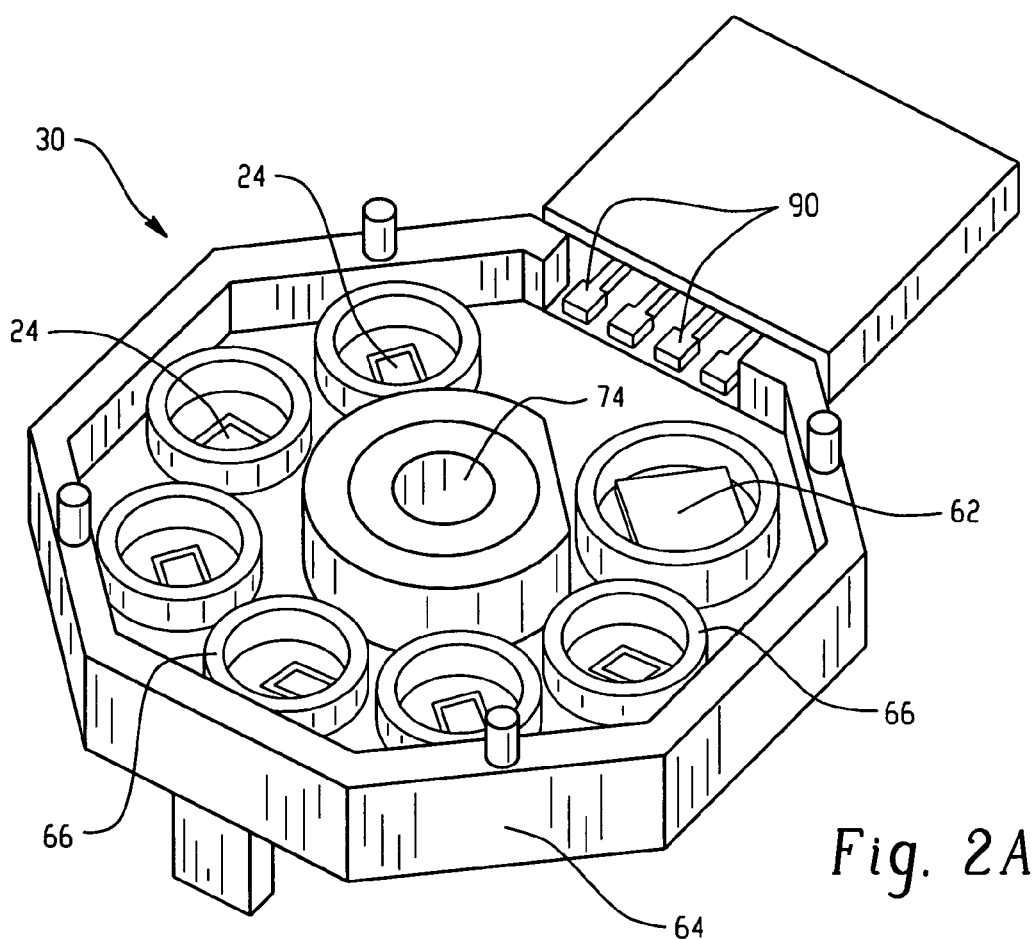
FIGS. 2A and 2B are representative top and bottom views of a package to be used in a manifold assembly according to one embodiment of the invention.
Figure 2B:
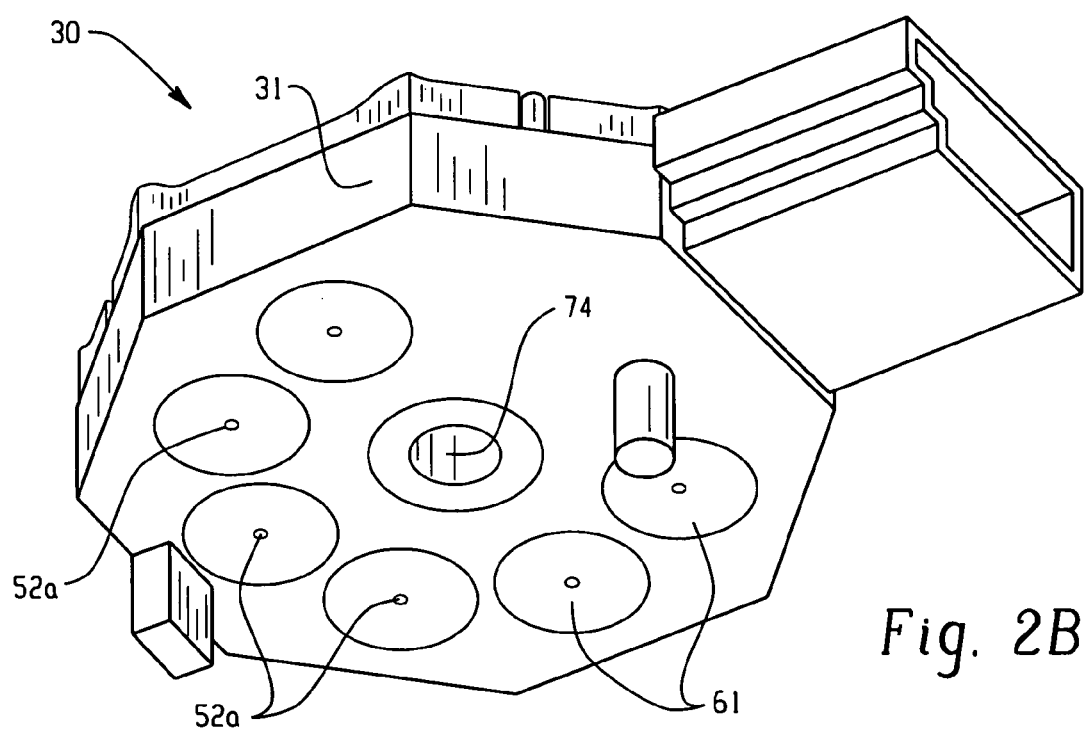

FIGS. 2A and 2B illustrate a package 30 configuration where the package 30 includes transducers 24 that are arranged roughly in a circular or hexagonal shape on their respective substrates 61. The transducers 24 and a processor 62 are housed in a package housing 64. Optional dams 66 or filler material may be included in the package 30 to stabilize the transducers 24 and the processor 62 to prevent damage and protect them from corrosive environments. The package housing 30 may also include a bolt hole 74 to allow the package 30 to be attached easily to the top plate 48 of the manifold 34 with a single bolt.

Because the transducers 24 and processor 62 are grouped together in a single package 30, only a minimum number of connection lines 90 are needed to connect the transducers 24 to a TCU (not shown). This reduces the overall length of the traces between the processor 62 and the transducers 24 and reduces the total number of connections to the TCU, making the overall pressure sensing system more noise-resistant. Further, the package 30 acts as a modular component that can be easily attached to the manifold 34 to form the inventive manifold assembly 32.

Figure 3:
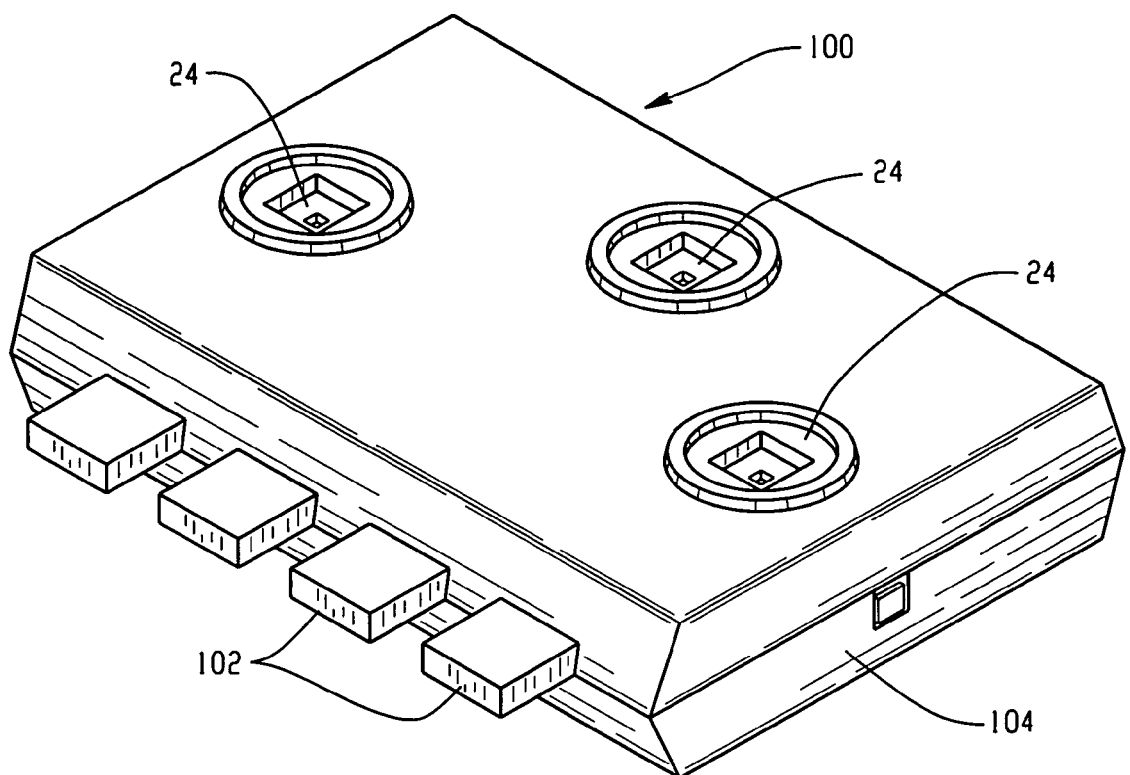
FIG. 3 is a representative top perspective view of a sub-package to be used in a package in a manifold assembly according to another embodiment of the invention.
Figure 4:
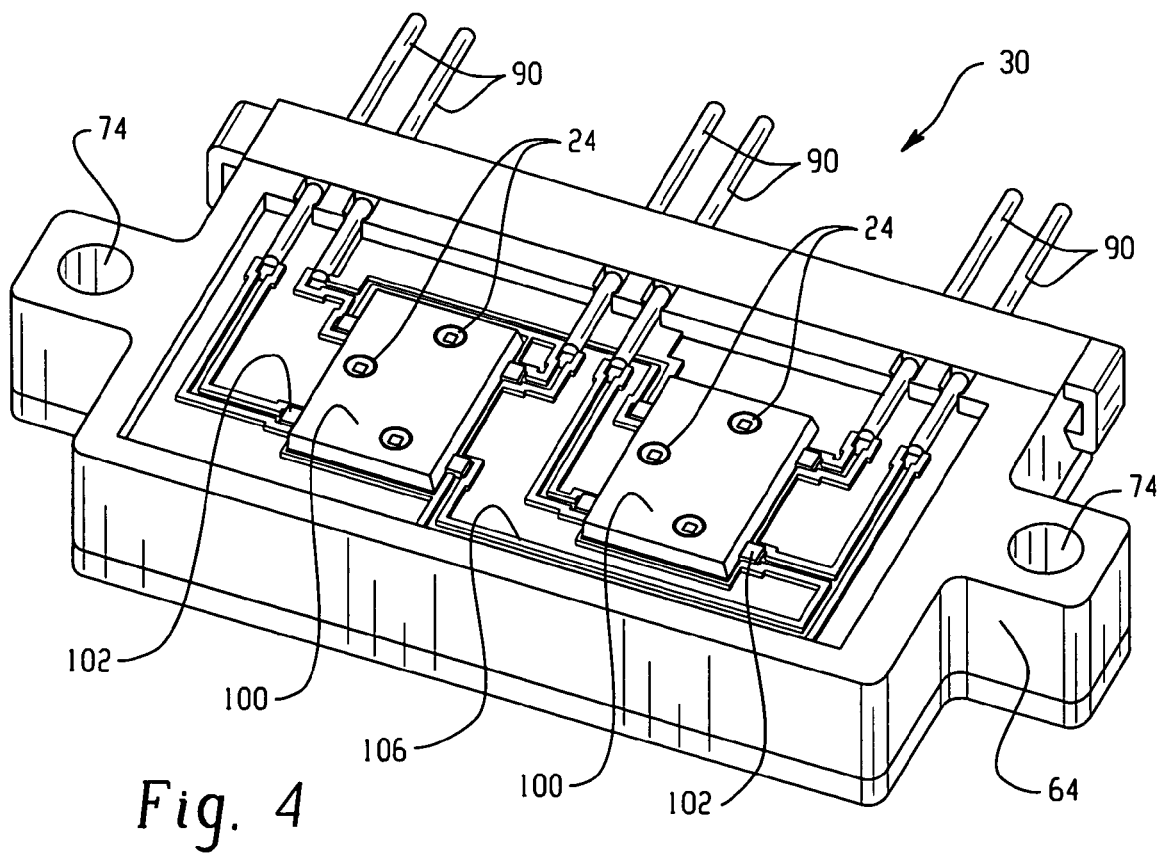
FIG. 4 is a representative top perspective view of a package incorporating the sub-package shown in FIG. 3.

FIGS. 3 and 4 illustrate another embodiment where the package 30 includes one or more sub-packages 100. FIG. 3 shows one embodiment of the sub-package 100. The sub-package 100 includes two or more of the transducers 24 and its own associated sub-package lines 102 and sub-package housing 104. As shown in FIG. 5, two or more of the sub-packages 100 are disposed in the package housing 64 to form the complete package 30. The sub-package lines 102 are coupled to package traces 106, which are in turn connected to the connection lines 90. In the example shown in FIG. 4, each sub-package 100 has its own data and clock connection lines, and the two sub-packages share power and ground lines. This embodiment may include a processor inside the sub-package housing 104. In this example, the package housing 31 includes two bolt holes 74 for attaching the package 30 to the manifold 34. Note that the sub-packages 100 may be calibrated before they are assembled into the package 30. This makes it possible for different entities to manufacture the sub-package 100 and the finished package 30.

The specific package 30 configuration is not critical to the inventiveness of the manifold assembly 32. The arrangements described above are simply illustrative examples of possible embodiments. Those of ordinary skill in the art will understand that the package can have different configurations without departing from the scope of the invention. Further, although the above examples focus on a transmission manifold, those of ordinary skill in the art will see that the inventive system can act as a fluid pressure sensing system in any application.

By incorporating one or more transducers and a processor into a single package and by configuring the manifold so that the hydraulic channels direct fluid to pressure ports at a central location, the invention provides fluid pressure monitoring and control capabilities without requiring multiple sensors at multiple locations. Instead, multiple sensors can be attached to the manifold as a single unit, reducing manufacturing costs and simplifying the overall system.

Although the invention has hereinabove been described with respect to the illustrated embodiments, it will be understood that the invention is capable of modification and variation and is limited only by the following claims.

What is claimed is:
1. A manifold assembly, comprising:
 a manifold having a plurality of hydraulic channels that route fluid to a plurality of pressure ports disposed at a central location in the manifold; and
 a pressure transducer package attached to the manifold at the central location, the package including
  a plurality of transducers, each transducer arranged to correspond with one pressure port, wherein each transducer generates a signal corresponding to fluid pressure in the pressure port;
  a processor that receives the signals from said at least one transducer; and a housing that houses said at least one transducer and the processor and that is attachable to the manifold.

2. The assembly of claim 1, wherein the manifold includes a body portion containing the plurality of hydraulic channels; and a top plate having the plurality of pressure ports.

3. The assembly of claim 2, further comprising a gasket disposed between the body portion and the top plate.

4. The assembly of claim 2, wherein the top plate has a plurality of counterbores surrounding the plurality of pressure ports.

5. The assembly of claim 1, wherein the plurality of transducers are arranged in at least two sub-packages within the package, each sub-package having at least one of said plurality of transducers and a sub-package housing.

* * * * *